United States Patent

[11] 3,573,517

| [72] | Inventor | Gordon E. Osterstrom<br>Winnetka, Ill. |
|---|---|---|
| [21] | Appl. No. | 15,733 |
| [22] | Filed | Mar. 2, 1970 |
| [45] | Patented | Apr. 6, 1971 |
| [73] | Assignee | Sargent-Welch Scientific Company<br>Skokie, Ill. |

[54] MAGNETIC DRIVE
15 Claims, 12 Drawing Figs.

[52] U.S. Cl. .................................................. 310/103
[51] Int. Cl. .......................................... H02k 49/06
[50] Field of Search .......................................... 310/103,
104, 105, 106, 162

[56] References Cited
UNITED STATES PATENTS

| 1,963,642 | 6/1934 | Beauchamp .................. | 310/106 |
|---|---|---|---|
| 2,505,500 | 4/1950 | Milde ........................... | 310/105 |
| 2,939,023 | 5/1960 | Fehr .............................. | 310/105 |
| 3,488,534 | 1/1970 | Baermann .................... | 310/93 |

*Primary Examiner*—D. X. Sliney
*Attorney*—Greist, Lockwood, Greenawalt & Dewey

ABSTRACT: A synchronous magnetic drive for transmission of rotary motion from a driving member to a driven member positioned in spaced-away relation to the driving member, which synchronous magnetic drive is characterized by improved stability, particularly during acceleration. An electrically conductive member is associated with at least one flux path of at least one magnetic circuit in the synchronous magnetic drive. The electrically conductive member is positioned relative to the flux path of the magnetic circuit in a manner wherein a change in flux in that flux path, caused by relative movement between oppositely facing magnetic poles of the driven and driving members, induces a current in the electrically conductive member which, in turn, induces countermagnetic forces to those associated with the change in flux. These countermagnetic forces act as a damper which stabilizes the driven and driving members of the synchronous magnetic drive.

Patented April 6, 1971 3,573,517
3 Sheets-Sheet 1
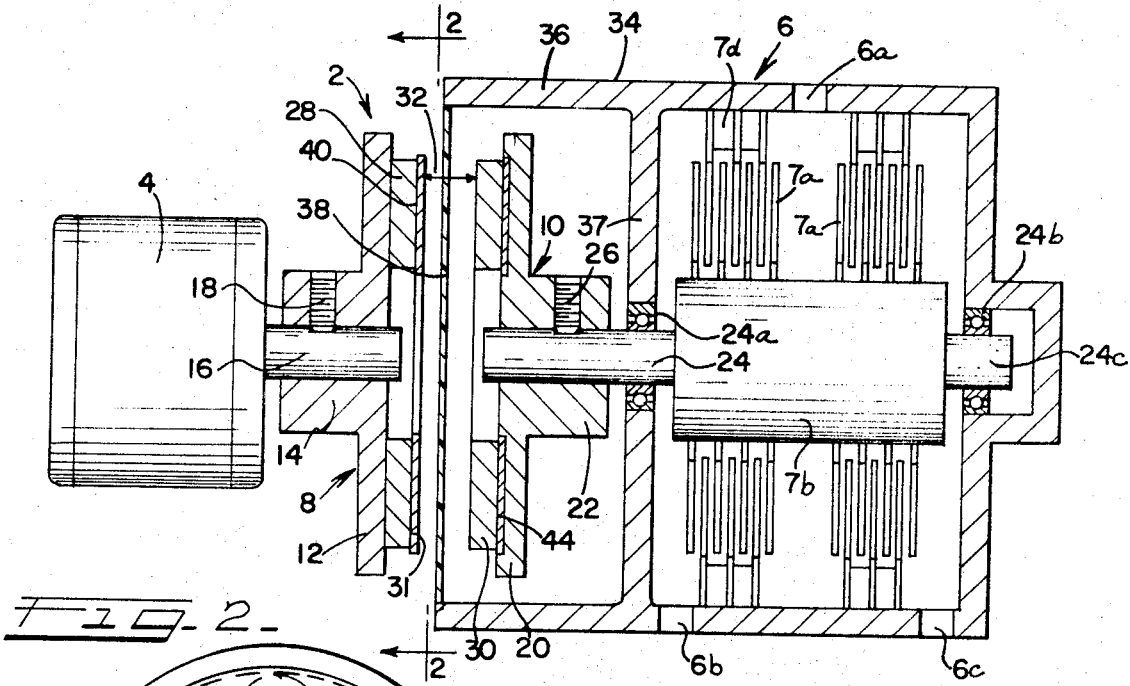
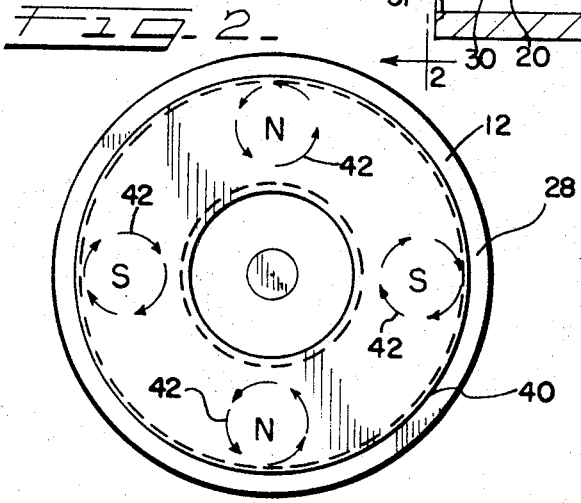
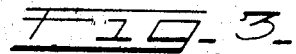
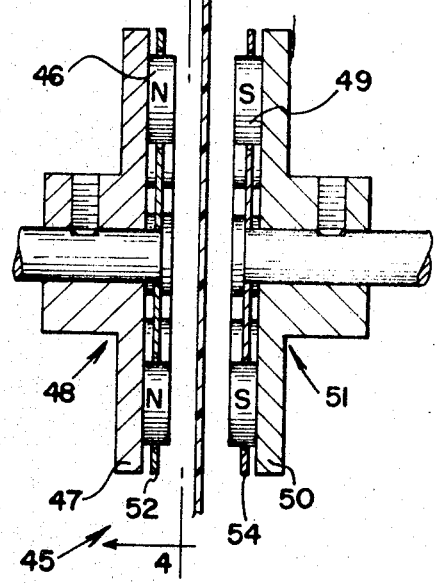
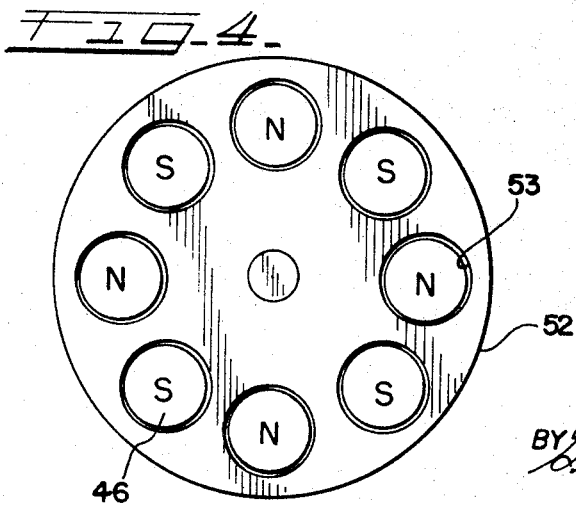
INVENTOR
GORDON E. OSTERTROM
ATT'YS.

Patented April 6, 1971
3,573,517
3 Sheets-Sheet 2
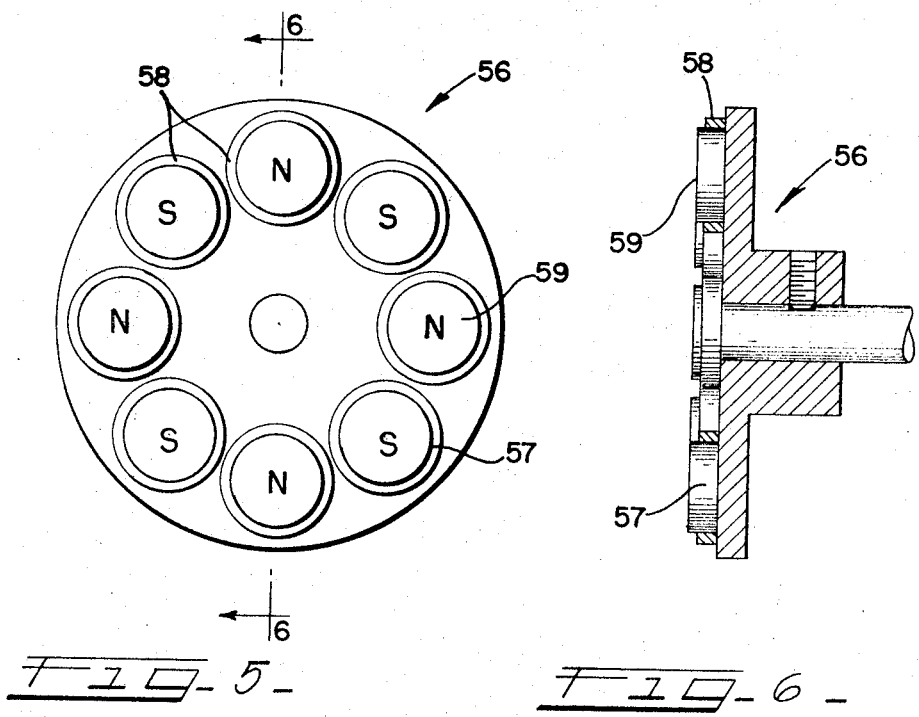
FIG-5-
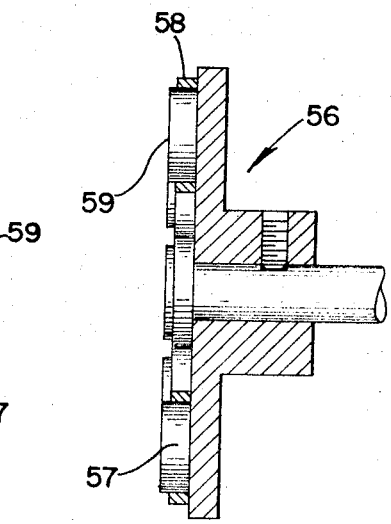
FIG-6-
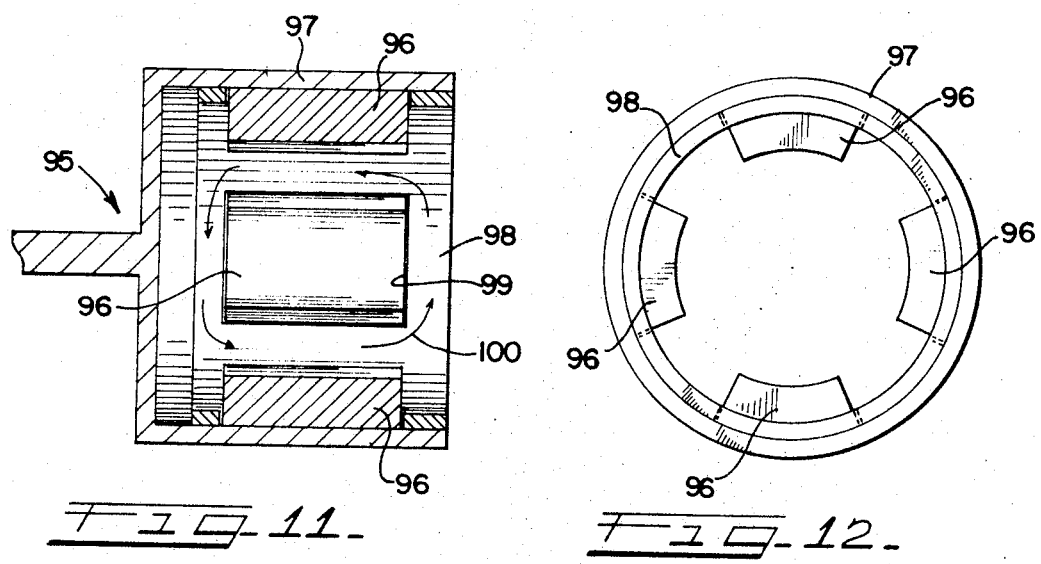
FIG-11-
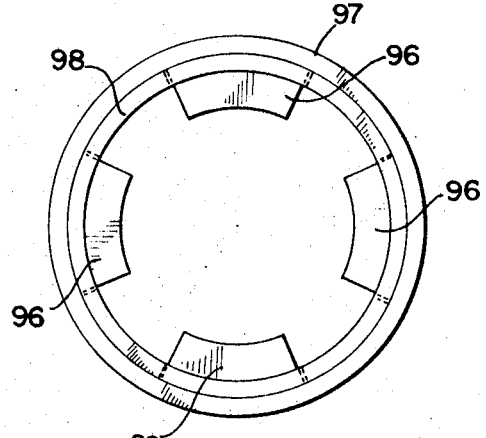
FIG-12-
INVENTOR
GORDON E. OSTERSTROM
BY
ATT'YS.

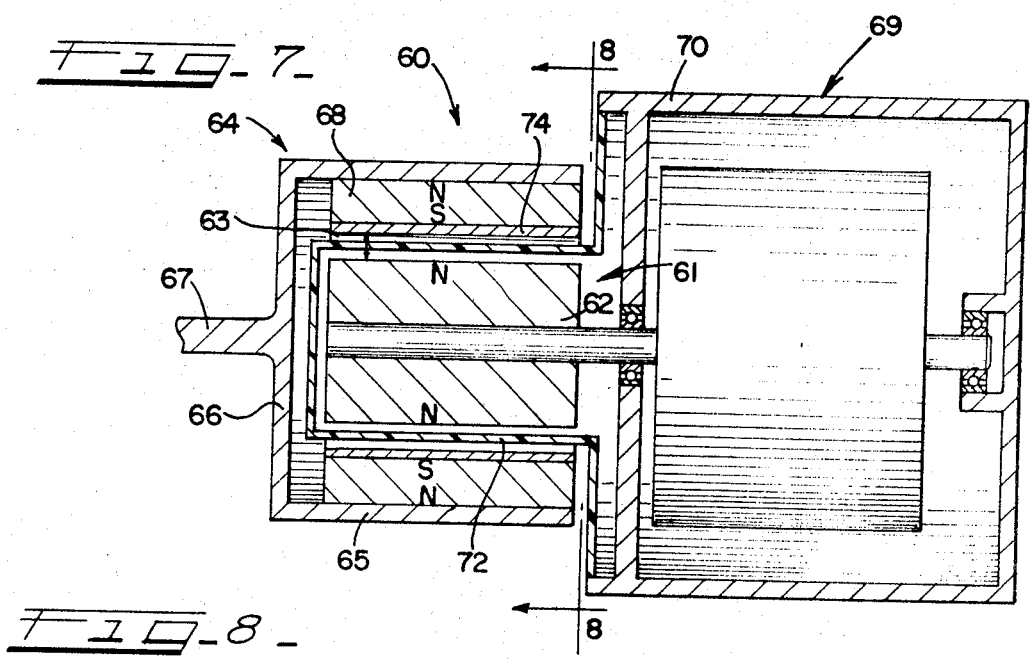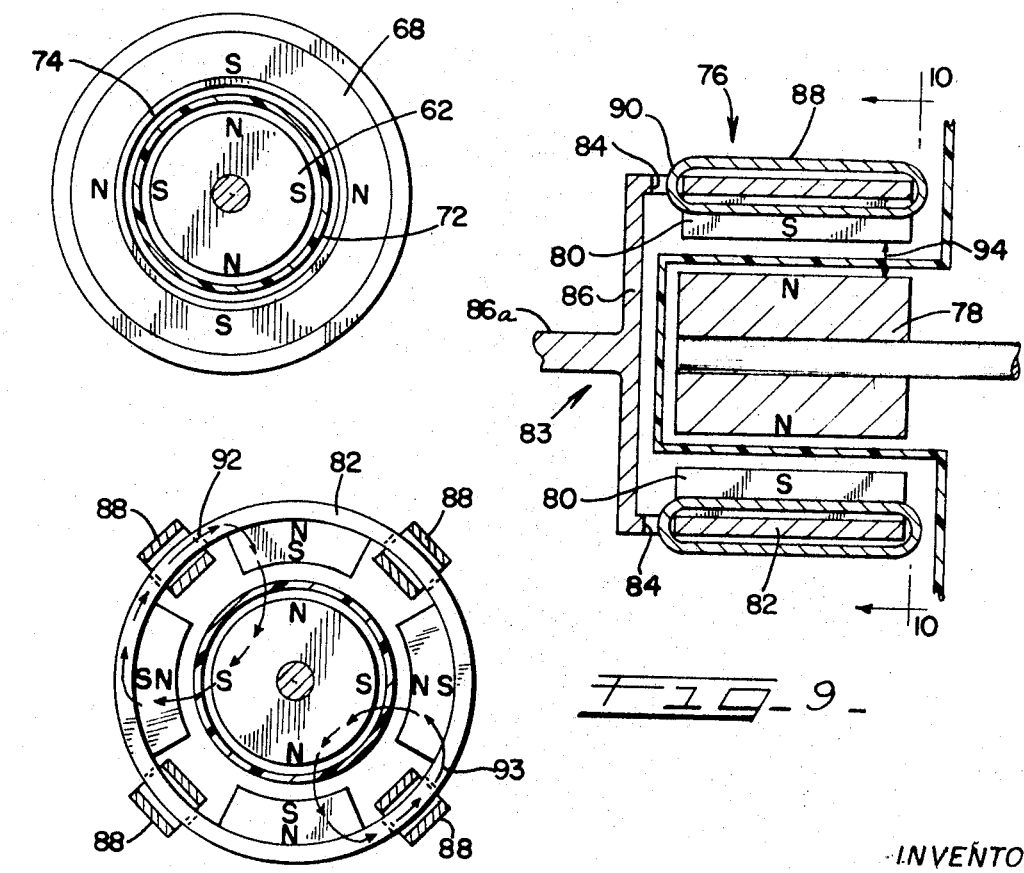

MAGNETIC DRIVE

BACKGROUND AND DESCRIPTION OF THE INVENTION

The present invention relates to an improved magnetic drive of the type wherein the driven and driving members are separated from each other by a gap and wherein the magnetic circuit of the magnetic drive includes at least one magnetic pole on the driving member aligned with at least one magnetic pole on the driven member. More particularly, this invention relates to a means for damping or opposing relative movement between oppositely facing magnetic poles on a driven member and a driving member of the magnetic drive. In the illustrated embodiment, the damping means includes an electrically conductive member associated with a magnetic circuit of the magnetic drive and positioned to form an electrical circuit around at least one flux of the magnetic circuit.

The development of strong permanent magnets, such as, for example, ceramic magnets, has enabled the expanded use of axial gap and radial gap synchronous or magnetic drives in applications wherein higher speeds and greater torque are required. These synchronous or magnetic drives are suitable for the transmission of rotary motion and torque across a gap, thereby eliminating the need for rotating shaft seals with their inherent problems. Particularly advantageous applications for these synchronous or magnetic drives are systems wherein the driving and driven members are maintained at greatly different environmental conditions, such as, for example, in a turbomolecular pump wherein the driven member is contained in a housing which is maintained at extremely low pressures and the driving member is normally maintained at atmospheric pressure.

Heretofore, in most systems wherein conventional magnetic drives have been used, such systems have functioned adequately since the speeds and torques encountered did not produce oscillations which were sufficient to disrupt the operation of the drive. However, in using such conventional magnetic drives with systems wherein high torque was required, it was observed that at certain speeds internal vibrations were developed which caused the magnetic drive to be thrown out of synchronization. For example, the use of these conventional magnetic drives with turbomolecular pump systems was noted to be unsatisfactory since, during the acceleration period, internal vibrations occurred which caused a torsional oscillation to develop which reached a sufficient angular magnitude so as to throw the conventional magnetic drive out of synchronization. In the desynchronized condition, the drive was useless since it was incapable of transmitting torque.

The present invention overcomes the inherent disadvantages of conventional synchronous magnetic drives. In particular, in one embodiment this invention includes an electrically conductive means, in association with at least one magnetic circuit of a magnetic drive, for opposing relative movement between the driving and driven members of the magnetic drive. The electrically conductive member is positioned in the flux path of a magnetic circuit of the magnetic drive and is arranged in a manner wherein a change in flux caused by relative movement between oppositely facing and cooperating poles on the driving and driven members induces a current in the electrically conductive member. This induced current induces a flux in the electrically conductive member which opposes the change in flux produced by the relative movement between the oppositely facing and cooperating poles of the driving and driven members.

While applicant does not rely upon any particular scientific theory to explain the operation of the present invention, it is believed that the stabilizing or damping system of this invention advantageously employs the principle that whenever a magnetic flux changes within a closed circuit defined by an electric conductor, currents are induced in that conductor which tend to oppose the change in flux. Accordingly, a flux change caused by relative displacement between the oppositely facing and cooperating poles of the drive results in electric currents in the conductor which cause countermagnetic forces to those associated with such relative displacement of the magnetic poles.

It is, therefore, an important object of the present invention to provide means for opposing relative movement between the driving and driven members of a spaced-apart magnetic drive.

Another object of the present invention is the provision of a damping arrangement for damping relative movement between the driving and driven members of a spaced-apart magnetic drive.

Another object of the present invention is the provision of means for maintaining the rotation of a driven member synchronized with the rotation of a driving member in a spaced-apart magnetic drive arrangement when the magnetic drive is accelerating through a speed range including a speed directly related to the natural frequency of vibration of the driving means, the driven means, or both.

Still another object of the present invention is the provision of an electrically conductive member positioned in at least one flux path of at least one magnetic circuit in a spaced-apart drive, which member is arranged so that a current is induced therein when there is relative movement between the driving and driven members of the magnetic drive.

Additional objects and advantages of the present invention, including these inherent in this invention, will become apparent from the following description of several preferred embodiments taken in conjunction with the accompanying drawings wherein:

FIG. 1 is a side elevational view, with portions thereof broken away, of an axial gap synchronous drive made in accordance with one embodiment of the present invention;

FIG. 2 is a sectional view taken along lines 2–2 of FIG. 1;

FIG. 3 is a sectional view of another embodiment of the present invention in an axial gap synchronous magnetic drive;

FIG. 4 is a sectional view taken along lines 4–4 of FIG. 3;

FIG. 5 is a sectional view, similar to FIG. 2, of the drive member in an axial gap magnetic drive made in accordance with a further embodiment of the present invention;

FIG. 6 is a sectional view taken along lines 6–6 of FIG. 5;

FIG. 7 is a side elevational view of a radial gap magnetic drive with portions broken away to show another embodiment of the present invention;

FIG. 8 is a sectional view taken along lines 8–8 of FIG. 7;

FIG. 9 is a sectional view of another embodiment of the present invention in a radial gap magnetic drive;

FIG. 10 is a sectional view taken along lines 10–10 of FIG. 9;

FIG. 11 is a sectional view of a driving member in a radial gap magnetic drive of another embodiment of the invention; and FIG. 12 is a sectional view taken along lines 12–12 of FIG. 11.

Referring to FIG. 1, an axial gap magnet drive is generally indicated at 2. For the purpose of illustration, the magnetic drive 2 is shown connected between an electric motor 4 and a turbomolecular pump 6. While not described in detail, it will be appreciated that turbomolecular pump 6 can be of conventional construction having an inlet 6a and outlets 6b and 6c. Similarly, the interior construction of the pump will include a plurality of rotor blades 7a which radially extend from a rotor 7b and a plurality of stator blades 7c which are spaced apart by spacer members 7d. It is to be understood, of course, that the improved synchronous magnetic drive of the present invention can be utilized with driving means other than an electric motor, and driven means other than a turbomolecular pump.

The magnetic drive 2 includes a driving member 8 and a driven member 10, both of which are made of a material having a magnetic permeability greater than unity. Preferably, the members 8 and 10 are made of a ferromagnetic material such as iron. The driving member 8 includes a disc portion 12 and a hub portion 14. The hub portion 12 is secured to a shaft 16 of the motor 4 by suitable means such as a setscrew generally indicated at 18. The driven member 10 is formed in like manner and includes a disc portion 20 integral with a hub portion 22 which is secured to a shaft 24 by a setscrew 26. As shown, shaft 24 coaxially extends from rotor 76 and is journaled by means of racer member 24a. A similar racer member 24b is provided for the journaled support of oppositely disposed shaft extension 24c.

The magnetic attraction between the member 8 and 10 is provided by permanent magnets formed as magnetic rings or annuli 28 and 30 and secured to the opposed faces of disc portions 12 and 20 of driving member 8 and driven member 10, respectively. As best seen in FIG. 2, the magnetic ring 28 comprises a plurality of north and south poles. For the purposes of illustration, the magnetic ring or annulus 28 is shown in FIG. 2 as having four poles, two north poles and two south poles on the outer surface or face 31 of the ring 28. If desired, however, fewer or more poles can be provided. It is to be understood, of course, that the magnetic ring or annulus 28 on the driving member 8 includes an equal number of north and south poles as the magnetic ring 30 on the driven member 10 and that the poles on the ring 28 are cooperatively aligned with poles of opposite polarity on the ring 30. Typically, the magnetic rings 28 and 30 are so-called ceramic magnets made from pressed and sintered mixtures of ceramic and magnetic powders.

As best seen in FIG. 1, the magnetic rings 28 and 30 are separated by an axial gap 32 which enables the driving and driven members to be operatively associated with each other, while at the same time being maintained under drastically different environment conditions. For example, in the illustrated embodiment, the driving member 8 is exposed to atmospheric conditions while the driven member is contained in the turbomolecular pump 6 which is maintained at extremely low pressures. Turbomolecular pump 6 has a housing 34 which includes a cylindrical casing 36, an inner wall 37 rotatably supporting the shaft 24 in racer member 24a, and, a nonmagnetic membrane outer wall 38 sealingly engaged to casing 36 and interposed between the driving member 8 and driven member 10.

In the operation of the axial gap magnetic drive illustrated in FIG. 1, the magnetic poles of opposite polarity are cooperatively aligned with each other to enable corotation of the driving member 8 and driven member 10. The magnetic circuits between the rings 28 and 30 will include a number of flux paths which are determined by the number of magnetic poles in each magnetic ring. Of course, the only high-reluctance portion of each flux path is in the axial gap 32 between the magnetic poles on the respective magnetic rings 28 and 30. Accordingly, the magnetic force of attraction between oppositely facing poles of opposite polarity on the magnetic rings 28 and 30 holds or locks the driven member 10 to the driving member 8 and operates to drive the driven member 10 at the same speed as the driving member 8.

In a steady state condition when a constant or varying torque is being transmitted at a constant speed, a conventional magnetic drive is generally satisfactory. However, when torsional vibrations in the system are developed such as, for example, when the resonant frequency (the natural frequency of vibration) of the motor, pump, or both is approached during acceleration, oscillations are developed which can reach sufficient angular magnitude to throw the magnetic drive out of synchronization. In such desynchronized condition, the drive is incapable of transmitting torque.

It is to be noted that in some magnetic drive systems the problem of torsional oscillation does not occur either because of the low operating speed of the system or because the natural frequency of vibration of the system and/or each of the components of the system is high, the system is never accelerated to, or through, a vibration inducing speed.

In accordance with an important aspect of the present invention, a damping system is provided which operates to prevent relative movement between the driven and driving members of the magnetic drive. In particular, electrically conductive means is provided in association with one or more of the magnetic circuits of the magnetic drive. This electrically conductive means is positioned in the path of one or more of the flux paths of one or more of the magnetic circuits established between and through the members 8 and 10 so that a change in flux caused by relative movement between oppositely facing magnetic poles induces a current in the electrically conductive means which, in turn, induces a flux in the associated flux paths which opposes the change in flux caused by such relative movement.

In the embodiment shown in FIGS. 1 and 2, the electrically conductive means is in the form of a copper plate 40 secured to the outer face 31 of magnetic ring or annulus 28. Relative movement between the oppositely facing magnetic poles in the magnetic rings 28 and 30 which tends to bring the respective poles of opposite polarity out of axial alignment with each other results in currents being induced in the plate 40 which follow a flow path as indicated by the arrows 42 shown in FIG. 2.

If desired, the electrically conductive means can be in the form of a copper plate 44 secured between the disc portion 20 of the driven member 10 and the magnetic ring 30. However, since the oscillatory energy will tend to be dissipated as heat in the conductive member, it is preferred in turbomolecular pump and similar systems that such conductive member be located on the driving member 8 only which is exposed to the atmosphere to facilitate removal of heat. If desired, other electrically conductive materials, e.g. aluminum, platinum, or silver can be used for the conductive members 40 and 44.

Where the driven means is a high-speed pump, such as a turbomolecular pump, it is preferable to make the end wall 38 of a thin nonconductive membranelike material such as, for example, glass or plastic having a thickness of approximately 0.085 inch. In general, the electrical conductivity allowable for the end wall 38 is determined by the speed at which the magnetic drive will be normally operating. For example, when the magnetic drive 2 will be operated at high speeds, it usually will be necessary to make the membrane from a material which has a very low electrical conductivity. On the other hand, at lower speeds, the membrane can be made of materials which exhibit greater electrical conductivity. In this regard, experience has shown that at low operating speeds, i.e., at speeds from 50 r.p.m. to 3,000 r.p.m., a steel membrane having a thickness of approximately 0.030 inches can be suitably employed.

It is to be appreciated that the present invention can be incorporated in a conventional magnetic drive, as shown in FIGS. 1 and 2, merely by securing the electrically conductive plate 40 to the outer face 31 of the magnetic ring 28. Of course, the insertion of the conductive plate 40 in the gap 32 may necessitate increasing the gap 32. An increase in the gap 32 is undesirable, however, since an increased gap will increase the reluctance of the magnetic circuits between the magnetic rings 28 and 30. For a given magnetomotive force in the rings 28 and 30, an increase in the reluctance of the magnetic circuits between the magnetic rings 28 and 30 will result in a reduction in the strength of the magnetic coupling between the rings, which reduction will, in turn, reduce the maximum torque which can be transmitted by the magnetic drive 2.

The embodiment of the present invention shown in FIGS. 3 and 4 illustrates an arrangement wherein the advantageous damping and synchronization stabilizing features can be achieved without increasing the gap between the driving and driven members. As is shown therein, an axial gap synchronous drive 45 is provided wherein a plurality of ceramic magnets 46 are received in a plurality of apertures or wells 53 formed in a plate 52 composed of an electrically conductive material. These magnets are secured to the disc 47 of a driving member 48 in place of the magnetic ring 28 shown in FIG. 1. These ceramic magnets 46 provide the magnetic poles of the driving member 48. In like manner, a plurality of ceramic magnets 49, equal in number to the magnets 46, are secured to the disc portion 50 of a driven member 51 and aligned with oppositely facing poles of opposite polarity formed by the magnets 46 secured to the disc portion 47.

Referring to FIGS. 5 and 6, another embodiment of the present invention is illustrated. In this embodiment, a plurality of separate magnets 57 are provided on a driving member 56. As is shown, each of the separate magnets 57 is circumferentially surrounded by an individual collar 58 which is composed of a material having high electrical conductivity, such as copper. In the illustrated embodiment, the member 56 includes eight magnets 57 which form eight magnetic poles for cooperation with eight similar magnetic poles on a driven member (not shown). If desired, individual conductive collars also can be mounted on each magnet of the driven member. Preferably, to keep the gap between the driven and driving members at a minimum, the collar should not extend beyond the end surface (pole face) 59 of each magnet.

Referring now to FIG. 7, a radial gap magnetic drive is generally indicated at 60. As shown, the drive 60 includes a driven member 61 in the form of a magnetic rotor 62 composed of a permanent magnet material which is received within, and separated by a radial gap 63 from an open-ended cylindrical driving member 64. The driving member 64 is cup-shaped having a cylindrical portion 65 which extends into an integral disc portion 66 which is integral with a shaft 67 of a driving means (not shown) similar to the motor 4 shown in fig. 1. If desired, the cylindrical portion 65 can be made of mild steel and will include a cylindrical magnetic collar 68 made of permanent magnetic material secured to the inner diameter thereof. As in the FIG. 1 embodiment, the driven means shown in FIG. 7 can be a turbomolecular pump 69, similar to the turbomolecular pump 6 of FIG. 1, which includes a casing 70 having a membrane wall 72 enclosing and sealing the magnetic rotor 62 from the driving member 64. In accordance with an important aspect of the present invention, an electrically conductive means in the form of an electrical conductive sleeve 74 is secured to the inner diameter of the cylindrical magnetic collar 68.

As best seen in FIG. 8, the magnetic rotor 62 has a plurality of magnetic poles which are radially aligned with an equal number of poles of opposite polarity in the cylindrical magnetic collar 68. For example, as shown in FIG. 8, the magnetic rotor 62 and the cylindrical magnetic collar 68 each have four magnetic poles, two north poles and two south poles. Operation of the radial gap magnetic drive 60 shown in FIGS. 7 and 8 is essentially the same as the operation of the axial gap magnetic drive 2 shown in FIG. 1, viz, the magnetic forces of attraction between oppositely facing poles of the magnetic rotor 62 and the cylindrical magnetic collar 68 keep the driving member 64 and the driven member 61 in radial alignment with each other.

In accordance with the present invention, relative rotational movement between the driven and driving members 61 and 64 will cause a change in flux which induces current in the sleeve 74. These currents in turn induce a flux in the flux paths of the magnetic circuits which results in a countermagnetic force which opposes the change in the alignment of the driving member 64 and the driven member 61.

In another embodiment, shown in FIGS. 9 and 10, a radial gap magnetic drive 76 includes a rotor 78 which is generally similar to the magnetic rotor 62 shown in FIG. 7. In this embodiment, however, four individual permanent magnets 80 are secured to the cylindrical portion 82 of a cup-shaped driving member 83.

As is best shown in FIG. 9, the cylindrical portion 82 extends into a flat end wall 83 having an integral shaft 86a which is connected to a suitable driving means (not shown). Four slots 84 are provided in the cylindrical portion 82 adjacent the disc end portion 86 of the driving member 83. Four separate electrically conductive bands 88 respectively extend through each of the slots 84 and encircle the sleeve 82 adjacent each of the permanent magnets 80. Preferably, the bands 88 are made of copper or other materials which exhibit low electrical resistance. It will be appreciated that while, in the illustrated embodiment, the bands 90 do not encircle each of permanent magnets 80, they are positioned in the flux paths of the magnetic circuits established in and between the magnetic rotor 78 and the driving member 83. Two such flux paths are indicated by the arrows 92 and 93 in FIG. 10. Thus, when there is a change in the flux flowing through the flux path 92 or 93, caused by relative movement between the oppositely facing poles of the driving member 83 and the magnetic rotor 78, currents will be induced in the bands 88. These currents will induce a flux in the flux paths 92 and 93 which will oppose the change in flux to oppose or damp relative movement between oppositely facing poles to maintain a synchronized relationship between the driving member 83 and the rotor 78. The embodiment shown in FIGS. 9 and 10 has the advantage that the bands 88 do not affect the size of the gap 94 between the magnets 80 and the rotor 78.

A driving member 95, of another embodiment of a radial gap magnetic drive, is shown in FIGS. 11 and 12. As shown in FIG. 12, four magnets 96 (similar to the four magnets 80 shown in FIG. 10) are secured to the inner surface of a cylindrical ring portion 97 of the driving member 95. An apertured sleeve 98, composed of copper of material exhibiting high electrical conductivity, having four apertures 99 is received over the four magnets 96 of the driving member 95. In this manner, relative rotational movement between the poles of the magnets 96 and the poles on a suitable magnetic rotor such as, for example, a rotor similar to magnetic rotor 78 in FIG. 9, will induce a current in the apertured sleeve 98. This current will, in turn, induce a flux in the flux paths of the magnetic circuits of the magnetic drive and the induced flux will oppose the change in flux. As in the other embodiments, the induced flux will function to maintain the driven and driving members in radial alignment with each other.

If desired, a sleeve of conductive material can be received on the magnetic rotor in any one of the radial gap magnetic drives shown in FIGS. 7—12 in place of, or in addition to, the conductive elements located on the driving members of each of the driving members of such previously described embodiments.

While certain specific and preferred embodiments of the present invention have been described above, it will readily be apparent to those skilled in this art that modifications and variations therefrom can be made without departing from the spirit and scope of the present invention. Accordingly, this invention is to be limited only to the scope of the appended claims.

I claim:

1. A synchronous magnetic drive for transmission of rotary motion from a driving member to a driven member positioned in spaced-away relation to said driving member, comprising a driving member adapted to be rotated along a given axis, a first magnet mounted on said driving member, a driven member adapted to be rotated along said given axis, said driven member being positioned in spaced-away relation to said driving member and separated therefrom by a gap, a second magnet on said driven member, said first magnet having a cooperating pole of a given magnetic polarity forming a magnetic circuit with a cooperating pole of opposite magnetic polarity of said second magnet, said first and second magnets being respectively arranged so as to induce corotation of said driven member in response to rotation of said driving member by a driving means in a manner whereby, upon such corotation, said cooperating poles of first and second magnets are intended to be in alignment with each other and maintain a substantially constant distance therebetween, and electrically conductive means mounted to at least one of said driving and driven members and defining an electrical circuit in operative association with said magnetic circuit, whereby a change in flux caused by relative movement between the respective cooperating poles of said first and second magnets taking said cooperating poles out of alignment with each other will induce a current in said electrically conductive means which will produce forces which oppose said change in flux and urge said first and second magnets back into alignment with each other.

2. The synchronous magnetic drive of claim 1 in which said driving member is separated from said driven member by a generally planar gap which is disposed perpendicularly to said axis of rotation.

3. The synchronous magnetic drive of claim 2 in which said electrically conductive means comprises a generally planar member which is perpendicularly disposed with respect to said axis of rotation.

4. The synchronous magnetic drive of claim 2 wherein said electrically conductive means is mounted to said driving member only.

5. The synchronous magnetic drive of claim 2 wherein said electrically conductive means comprises a generally planar member perpendicularly disposed with respect to said axis of rotation and having a surface which defines one boundary of the gap between said driving and driven members, said generally planar member having an aperture formed therein sized to receive the magnet associated therewith, whereby the cooperating pole of said magnet associated with said electrically conductive means extends in a direction toward the cooperating pole of the other magnet.

6. The synchronous magnetic drive of claim 5 wherein said magnet associated with said apertured generally planar member extends toward the cooperating pole of the other magnet to a distance at least equal to the boundary-defining surface of said generally planar member.

7. The synchronous magnetic drive of claim 2 wherein said electrically conductive means comprises an annular collar which surrounds one of said cooperating poles of said first and second magnets.

8. The synchronous magnetic drive of claim 7 wherein said annular collar surrounds said first magnet on said driving member only.

9. The synchronous magnetic drive of claim 1 wherein said driving member is separated from said driven member by a generally circumferential gap having a common axis with said axis of rotation of said driving and driven members, first and second magnets being respectively mounted on said driving and driven members for intended radial alignment with each other during normal operation thereof.

10. The synchronous magnetic drive of claim 9 wherein said electrically conductive means comprises a generally cylindrical sleeve.

11. The synchronous magnetic drive of claim 10 wherein said generally cylindrical sleeve is mounted to said driving member only.

12. The synchronous magnetic drive of claim 9 wherein said electrically conductive means comprises a generally cylindrical sleeve having an aperture formed therein sized to receive the magnet associated therewith, said generally cylindrical sleeve having an outer surface which defines one boundary of the generally cylindrical gap between said driving and driven members, whereby the cooperating pole of said magnet associated with said electrically conductive means extends in a direction toward the cooperating pole of the other magnet.

13. The synchronous magnetic drive of claim 12 wherein said magnet associated with said apertured generally cylindrical sleeve extends toward the cooperating pole of the other magnet to a distance equal to the boundary-defining surface of said generally cylindrical sleeve.

14. The synchronous magnetic drive of claim 12 wherein said generally cylindrical sleeve is mounted to said driving member only.

15. The synchronous drive of claim 8 wherein said electrically conductive means comprises an electrically conductive band which surrounds at least a portion of one of said driving and driven members.